CARD PROCESSING APPARATUS

Filed Oct. 8, 1956 3 Sheets-Sheet 1

INVENTORS:
Philip N. Armstrong
Jerome B. Wiener

By Smyth & Roston
Attorneys

CARD PROCESSING APPARATUS

Filed Oct. 8, 1956 3 Sheets-Sheet 2

INVENTORS:
Philip N. Armstrong
Jerome B. Wiener
By Smyth & Roston
Attorneys

Sept. 22, 1959 P. N. ARMSTRONG ET AL 2,905,465

CARD PROCESSING APPARATUS

Filed Oct. 8, 1956 3 Sheets-Sheet 3

INVENTORS:
Philip N. Armstrong
Jerome B. Wiener

By Smyth & Roston
Attorneys 2,905,465
Patented Sept. 22, 1959

2,905,465

CARD PROCESSING APPARATUS

Philip N. Armstrong, Santa Monica, and Jerome B. Wiener, Granada Hills, Calif., assignors to The Magnavox Company, Los Angeles, Calif., a corporation of Delaware Application October 8, 1956, Serial No. 614,604
23 Claims. (Cl. 271—5)

The present invention relates to apparatus for processing information cards as they are circulated on a vacuum pressure transporting drum or on other suitable transporting media. More particularly, the invention is concerned with a control mechanism which serves to control the position of selected ones of the information cards on the transporting medium so as to delay such cards by any desired and controllable amount.

Significant advances have been made in recent years in systems for processing data. These systems in general are predicated on binary digital principles, and in most systems of this type the processed information is stored as bits of binary data on a plurality of information cards. These bits of data may be represented on each card by the presence or absence of holes or by magnetic dots of a first or second polarity.

In order that the information cards and the data stored on the cards may be made readily available on a fully automatic basis, apparatus and systems have been devised for selecting, storing, filing, collating, sorting and for otherwise processing the cards themselves. All of these operations serve to accomplish a particular purpose, namely, to select and bring a desired card from a stored position to a processing position where it can be examined either to read and utilize information that is already on the card or to record new information on the card.

One extremely useful and most efficient system has recently been devised for transferring the cards from a stored position to a processing position. This system utilizes rotatable drums in which vacuum pressure is produced at their respective peripheral edges. This vacuum pressure serves to retain the cards firmly on the peripheries of the drums so that they may be conveniently transported by the drums from one position to another. Appropriate transferring and gating means serve to transfer the cards from respective storage stacks to the drums and from one drum to another. In this way, the cards can be rearranged in different orders than their original orders such as by sorting, merging and collating operations.

It is often desirable in rearranging the order of a plurality of cards that the position of one or more of the cards on the peripheral surface of a transporting drum be changed with respect to other cards in the plurality. This is usually achieved in the prior art by gating the card or cards whose position is to be so occupied to an adjacent holding drum. This method, however, even though it does operate satisfactorily to achieve this purpose, is somewhat slow and requires relatively complicated control equipment. Such equipment is not necessarily slow and complicated relative to other equipment but only in relation to the apparatus constituting this invention.

The present invention provides a simple mechanism by means of which the position of cards on a transporting drum can be selectively and controllably altered with respect to the position of other cards. The mechanism of the invention is relatively simple in its construction and does not require a complicated control system. Moreover, the mechanism does not introduce any extraneous and unwanted delays or interruptions to the sorting, collating or other operations to be performed on the cards.

The mechanism of the invention may be considered the mechanical equivalent of an electrical delay line of variable length. That is, the mechanism is capable of imparting any desired and controllable "delay" to any information card or cards selected from a plurality of such cards in a data processing system. The mechanism is also capable of controlling the transfer of the cards to one or more output stacks after the variable delay has been obtained. In this way, the mechanism can be considered as an inverter for rearranging the positions of various cards in a plurality.

Figures 1, 3:
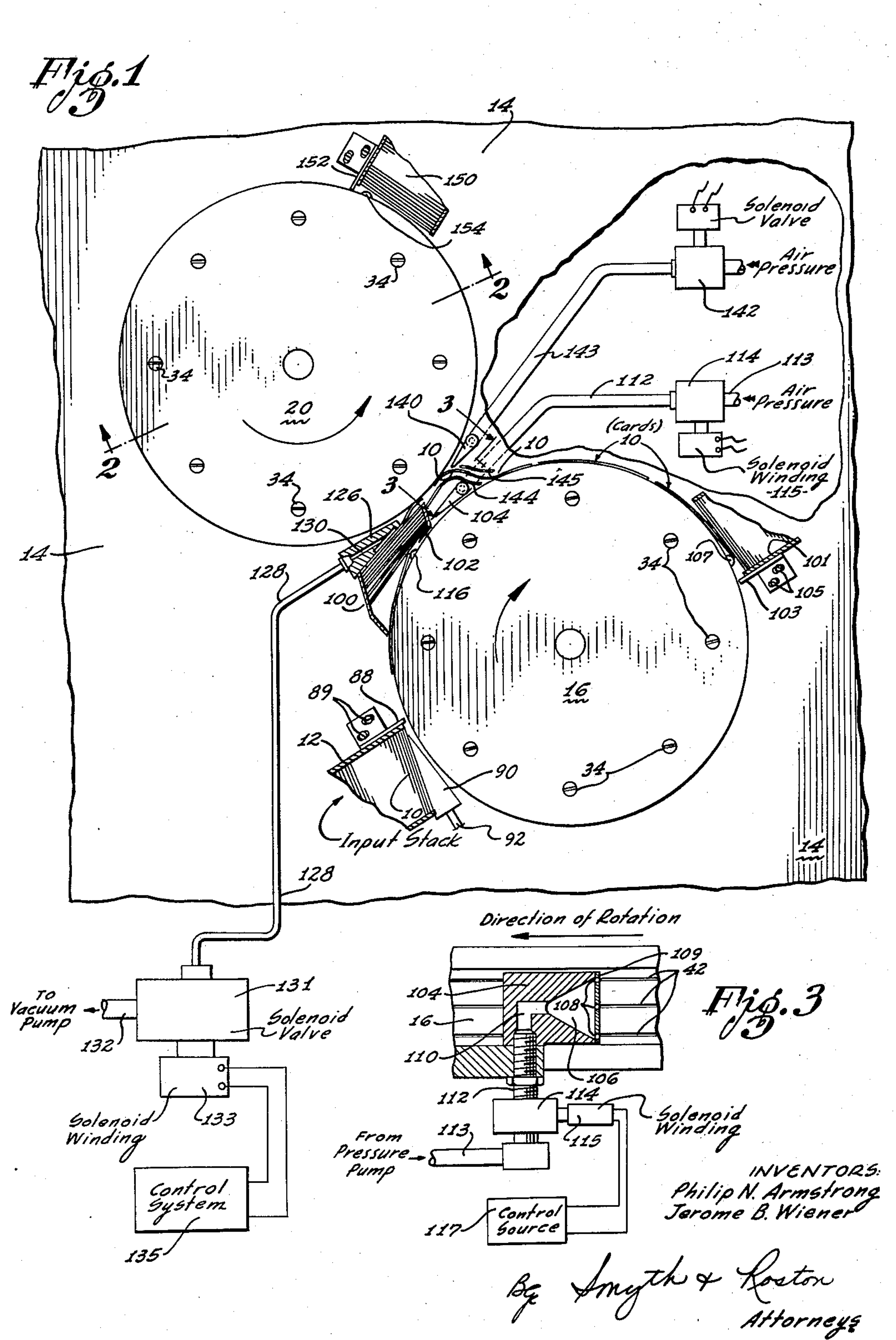
Figure 1 is a top plan view somewhat schematically illustrating the apparatus of the invention and showing a rotatable transporting drum, an auxiliary drum, and card stacking means and associated transfer mechanisms for controlling the position of selected ones of the cards on the transporting drum and also illustrating certain mechanical and electrical controls in the transfer mechanisms.
Figure 3 is a sectional view substantially on the line 3—3 of Figure 1 and illustrates in detail a pneumatic lifter used in the invention.

In the embodiment of the invention shown in the drawings, a plurality of cards 10 (Figure 1) are disposed in a stack 12. The bottom edge of each card in the stack rests on a flat surface such as the top 14 of a supporting table. The cards in the stack 12 are supported by the table in essentially a vertical plane. The stack 12 is mounted on the table top 14 with its mouth adjacent the peripheral surface of the drum 16. The relationship is such that cards may be successively drawn from the mouth of the stack 12 by the drum 16. The cards are then circulated on the peripheral surface of the drum 16.

The cards 10 are the information cards referred to previously. That is, each card is provided with a plurality of bits of data represented, for example, by the presence or absence of holes or by magnetic dots of one polarity or another. These bits of data, either by themselves or in combination with other bits, represent digital information. The digital information, for example, may relate to numbers, letters, alphanumeric coding (combinations of numbers and letters) or to other pertinent data.

A pair of drums 16 and 20 are mounted for rotation about spaced vertical axes. These drums are disposed above the top of the table 14 in essentially the same plane. The drum 20 of the illustrated embodiment is adapted to be rotated in a particular direction such as in a counterclockwise direction. The drum 16 is adapted to be rotated in the opposite or clockwise direction. Actually, the drums 16 and 20 may even be rotating in the same direction as described in co-pending application Serial No. 614,686 filed October 8, 1956 by Jerome B. Wiener and Loren R. Wilson. For example, both of the drums may be rotating in a counterclockwise direction.

Figure 2:
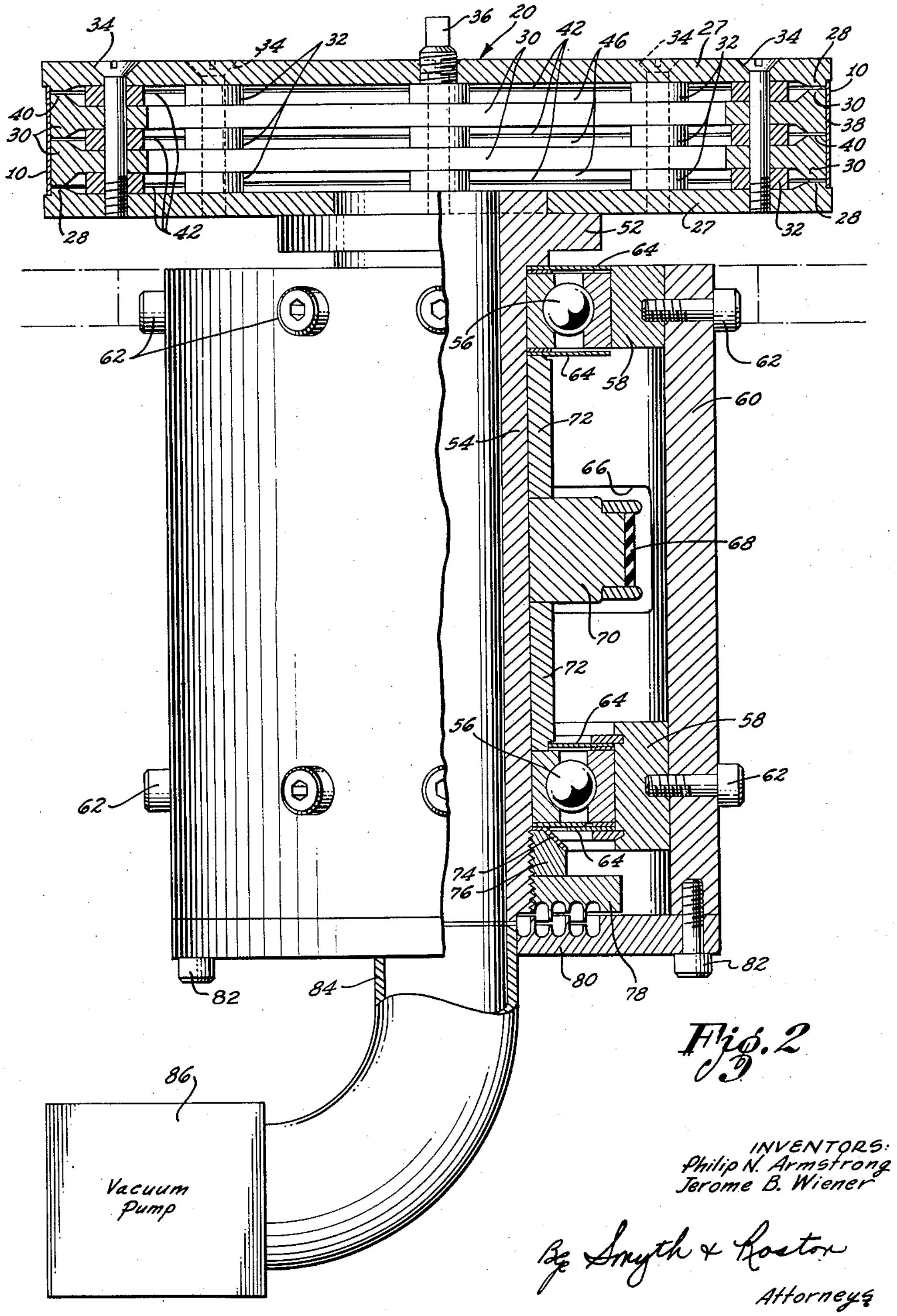
Figure 2 is an enlarged sectional view substantially on the line 2—2 of Figure 1 and shows the details of a typical vacuum-pressure transporting drum which may be included in the apparatus constituting this invention.

Both of the drums 16 and 20 are constructed to exhibit a vacuum pressure at their respective peripheral edges, This vacuum pressure, as previously noted, serves to retain the cards firmly on the peripheries of the drums. Since the drums may be similar in their construction, the details of only the drum 20 are shown in Figure 2 and described in full. It will also be appreciated that the drums can be constructed in a different manner than that described below. For example, drums similar to that described in co-pending application Serial No. 600,975 filed July 30, 1956, by Loren R. Wilson can also be used.

The drum 20 includes a pair of spaced parallel external disc-like plates 27 mounted in coaxial relation. A pair of internal disc-like plates 30 is disposed between the plates 27 and in coaxial relation with the plates 27. The inner face of each of the plates 27 includes an annular peripheral lip 28. The plates 30 are held by a plurality of groups of spacers 32 in mutually spaced parallel relation and in spaced relation with the plates 27. These spacers are held in place by a corresponding plurality of studs 34. These studs 34 extend through the plates 27 and 30 at respective positions adjacent the peripheral edges of the plates. The studs also serve to maintain the drum in a rigid assembled condition. A plug 36 extends into a threaded aperture at the center of the top plate 27.

The radius of each of the inner plates 30 is made slightly less than the radius of each of the outer plates 27. This difference in radius between the inner and outer plates is made substantially equal to the thickness of the cards 10 and it serves to form a peripheral channel 38 around the drum for the cards. The rim of each of the inner plates 30 has an increased thickness with respect to the remaining portions of these plates. These rims are indicated at 40 and they cooperate with the respective lips 28 of the outer plates 27 to produce a series of slots 42 extending around the periphery of the drum in the peripheral channel 38 referred to above. The slots 42 communicate with suction passageways 46 which are formed between the plates 27 and 30.

The portion of the rotatable drum described above is supported on a rotatable annular collar 52. This collar is integrally formed at one end of a vertical hollow drive shaft 54. Suitable bearings 56 are mounted at spaced axial positions on the shaft 54 adjacent the opposite ends of the shaft. These bearings serve rotatably to mount the shaft in a housing 60, the bearings being retained within the housing by suitable bushings 58. The bushings 58 are secured to the housing by a series of studs 62. The bearings may be sealed by appropriate oil seals 64.

An opening 66 is formed in the housing 60 at a position corresponding to an intermediate position of the shaft 54. This opening enables a drive belt 68 to extend into the housing and around a pulley 70. The pulley 70 is rigidly mounted on the hollow shaft 54 in coaxial relation with the shaft. A pair of cylindrical sleeves 72 are mounted coaxially with the shaft 54 on opposite sides of the pulley 70. These sleeves serve as axial spacers for the bearings 56. In this manner, the shaft 54 and the drum assembly can be rotated by a suitable motor (not shown).

The bearings 56 and the pulley 70 are maintained in assembled condition on the shaft 54 by means of a nut 76 threaded to the lower end of the shaft. The nut 76 has an associated lock washer 74. A seating disc 78 cooperates with a bottom plate 80 of the housing 60 to form an air seal between the hollow rotatable shaft 54 and the housing 60. The plate 80 is secured to the housing 60 by a series of studs 82. The plate 80 has a central aperture therein which is axially aligned with the interior of the hollow shaft 54. A hollow conduit 84 is mounted in friction fit in the aperture of the plate 80. This conduit 84 extends to any suitable type of vacuum pump as indicated by the block 86.

The vacuum pump drawn air in through the slots 42 and through the passages 46 down the hollow shaft 54 and through the conduit 84. A vacuum pressure is, therefore, established at the peripheral channel 38, and this vacuum pressure serves to retain the cards firmly on the peripheral surface of the drum when the cards have become transferred to the drum.

A throat member 88 is mounted on the top of the table 14 adjacent the trailing edge of the stack 12 with respect to the direction of rotation of the drum 16. This throat member is held in place by a pair of set screws 89 which extend through slots in the member. This arrangement enables the member to be adjustably positioned toward or away from the periphery of the drum 16. The throat member 88 is fixed at a selected position such that it prevents more than one card at a time from passing between it and the periphery of the drum 16. Therefore, as the drum 16 rotates, the vacuum pressure at its periphery selects the leading card from the stack 12 and draws that card from the stack and past the throat member 88. When the first card has passed the throat member 88, a second card is then drawn from the stack by the drum 16 in the same manner. The drum 16 operates, therefore, continuously to draw cards in succession from the stack 12.

A retainer 90 may be associated with the input stack 12. The retainer 90 is disposed in contiguous relationship to the drum 16 and to the input stack 12. The retainer 90 is provided with a mouth portion which engages the trailing portion of the leading card in the stack 12. A conduit 92 extends from the mouth portion of the retainer and communicates with the vacuum pump 86 (Figure 2). By this arrangement, a vacuum force is created at the mouth of the retainer 90. This vacuum force acts on the leading card in the stack 12 in a direction opposing the vacuum force exerted on the card by the drum 16. The opposing force exerted by the retainer 90 is effective in preventing the card from being withdrawn from the stack 12 by the drum 16.

When the vacuum force in the retainer 90 becomes interrupted, the force exerted on the leading card in the stack 12 by the drum 16 becomes predominant and the card becomes withdrawn by the drum from the stack. By interrupting the vacuum force in the retainer 90 periodically or at a variable rate, an intermittent release of cards from the input stack 12 is obtained. The vacuum force in the retainer 90 may also be completely and continuously cut off to obtain the release of a continuous stream of cards from the input stack 12 on a sequential basis. The retainer 90 and its associated members may be constructed in a manner similar to that described in detail in co-pending application Serial No. 552,506 filed December 12, 1955, by Hans M. Stern.

An output stack 101 is also positioned adjacent the peripheral surface of the drum 16. This output stack is angularly displaced around the drum in a clockwise direction from the stack 12. The output stack has its entrance adjacent the edge of the drum. A stop member 103 is fastened to the table top 14 adjacent the trailing edge of this stack with respect to the direction of rotation of the drum. The stop member is fastened to the table top as by screws 105.

A plurality of pawls 107 are positioned adjacent the entrance of the output stack 101. These pawls extend into the peripheral slots 42 in the drum 16 and have center portions which are bulged out from the drum, as illustrated. Each card circulated by the drum 16 to the member 103 is stopped by that member with its trailing edge projecting over the pawls 107. The next card then passes over the pawls and under the preceding card to strip the preceding card from the drum and deposit the preceding card in the output stack 101.

A stack 100 is positioned adjacent the peripheral surface of the drum 16. The stack 100 is angularly displaced in a clockwise direction around the drum 16 from the stack 12 and is disposed between the input stack 12 and the output stack 101 in the direction of rotation of the drum. The stack 100 has an entrance end disposed adjacent the peripheral surface of the drum and extends between the drums 16 and 20. The exit end of the stack 100 is disposed adjacent the peripheral surface of the drum 20.

At the end of the stack 100 facing the drum 16, the stack has an arcuate throat member 102 which extends from the trailing edge of the stack with respect to the direction of rotation of the drum 16. This throat member extends partially across the entrance end of the stack adjacent the periphery of the drum 16. The throat member 102 is spaced a sufficient distance from the drum 16 to enable a card to pass between it and the periphery of that drum. The throat member 102 is preferably tapered at its forward end to facilitate the transfer of cards from the drum 16 to the stack 100.

The throat member 102 is arranged so that the cards in the peripheral channel of the drum 16 move with the drum past the stack 100, and the cards are not transferred to the stack so long as no force is being exerted against them. However, a tangential force may be controllably exerted against the cards by a flow of air or other fluid through a lifter 104. When such a flow is initiated, the leading edge of the transported card against which it is directed is forced away from the periphery of the drum 16, and that particular card is seized by the throat 102. When a card becomes so positioned on the throat member 102, subsequent rotation of the drum 16 causes the card to be stripped from the peripheral channel of the drum and deposited in the stack 100.

Figure 4:
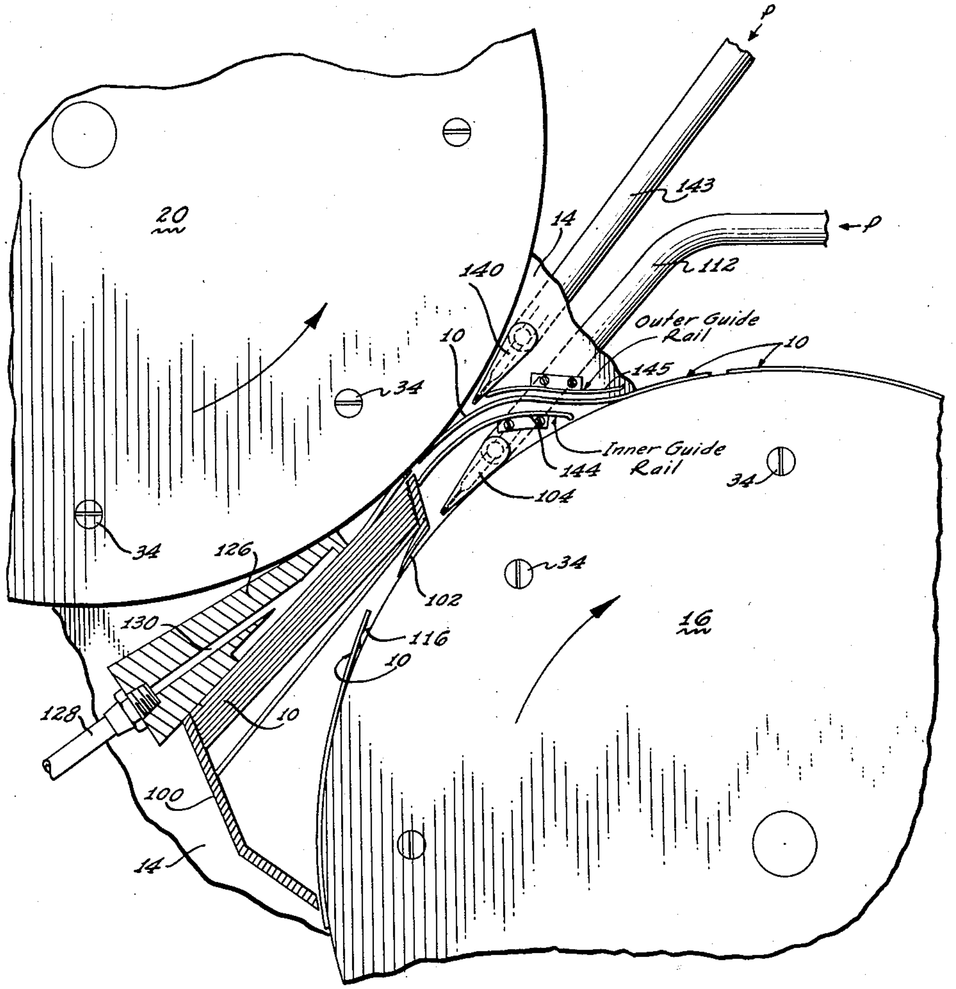
Figure 4 is an enlarged fragmentary view of a portion of the apparatus shown in Figure 1 and particularly shows the card stacking means and associated transfer mechanisms referred to above.

As illustrated in Figures 1 and 4, the lifter 104 is positioned in essentially tangential relation with the drum 16, with its mouth adjacent the trailing edge of the stack 100 with respect to the direction of rotation of the drum 16. The lifter is spaced from the periphery of the drum 16, however, a distance sufficient to enable a card to pass between it and the drum.

The construction of the lifter 104 and of its associated members and controls is shown in further detail in Figure 3. Although one embodiment of the lifter 104 is shown in Figure 3, it should be appreciated that other types of lifters may also be used. The lifter has a plan shape which corresponds substantially to a tear drop, and it is symmetrical about its central axis. This central axis, as previously noted, is essentially tangential with the periphery of the drum 16 at a point which is displaced angularly from the entrance end of the stack 100 in the direction of rotation of the drum 16.

The lifter has a tapered configuration such that its narrow end or mouth is near the periphery of the drum 16. The lifter has a hollow interior which has an essentially parabolic shape and which defines its mouth portion 106 (Figure 3). A plate 109 is formed over the mouth portion of the lifter, and is provided with a series of apertures 108 which extend through the plate and which are respectively aligned with the slots 42 in the peripheral channel of the drum.

A passageway 110 extends through the lifter, and this passageway communicates with the mouth portion 106. A feed line 112 is coupled to the other end of the passageway 110 by any suitable coupling. The feed line 112 extends downwardly from the passageway 110 so that the lifter can extend under a pair of guide rails 145 and 144, which will be described in detail subsequently. The other end 113 of the feed line is adapted to receive air under pressure from any suitable source (not shown). A suitable solenoid-actuated valve 114 of any known type is disposed in the air line 112 to control the flow of air through the line. This valve may be a usual solenoid-operated type and includes a solenoid winding indicated by the block 115. The valve is opened whenever the winding is energized as by a control source indicated by the block 117 in Figure 3.

When the winding of the solenoid valve 114 is so energized and the valve is opened, air under pressure passes to the lifter 104. This air flows through the passageway 110 and through the mouth 106 to emerge as streams of air under pressure from the apertures 108. The streams of air passing through the apertures 108 have a relatively high velocity because of the relatively small diameter of the apertures. The streams, therefore, impinge on the periphery of the drum 16 with a relatively high force. This impingement of the streams is in a tangential direction between the throat 102 and the periphery of the drum 16. The air streams in effect exert a shearing force between the periphery of the drum 16 and the particular card 10 which they contact. This shearing force is effective in lifting the leading edge of the card from the periphery of the drum against the retaining vacuum pressure in the peripheral channel of the drum. The leading edge of the lifted card then is engaged by the throat 102, and subsequent rotation of the drum 16 causes the card to enter the entrance end of the stack 100.

In this manner, so long as the solenoid valve 114 is not energized, the cards on the periphery of the drum 16 are circulated past the entrance end of the stack 100, under the throat 102 and under the lifter 104. The solenoid valve 114 may be energized at controlled intervals to select one or more cards from the periphery of the drum 16 and to deposit the selected cards in the stack 100 in the described manner.

A plurality of pawls such as the pawl 116 are fixedly mounted adjacent the leading edge of the stack 100 at the entrance end of the stack. These pawls function, like the pawls 107, to insure that the cards 10 withdrawn from the periphery of the drum 16 by the lifter 104 will be positioned in the proper order in the stack 100. The pawls 116 are displaced angularly from the trailing edge of the stack 100 against the direction of rotation of the drum 16 by a distance less than the length of a card. The pawls extend at their opposite ends into the slots 42 of the drum and have a humped intermediate portion. These pawls lift the trailing edge of each card transferred to the stack 100 so that the next card must pass under the previous card positioned on the pawl. In this way, the next card is instrumental in prying the previous card from the periphery of the drum so that the previous card becomes deposited in the stack 100. This assures that the order of the cards in the stack 100 will not be altered with respect to the order of the cards in the input stack 12.

The construction and operation of the lifter 104 and its associated members are fully disclosed and described in detail in co-pending application, Serial No. 562,154, filed January 30, 1956, in the name of Stuart L. Peck and assigned to the assignee of the present application. Constructional details of the pawls 116 are shown and described in co-pending application Serial No. 571,086, filed March 12, 1956, in the name of Minoru T. Endo which is also assigned to the assignee of the present application.

As previously noted, the exit end of the stack 100 is disposed adjacent the periphery of the drum 20. A card retainer 126 may be associated with this exit end. This retainer and its associated mechanisms may be similar to those disclosed in copending application, Serial No. 552,506, filed December 12, 1955, in the name of Hans M. Stern and which is assigned to the present assignee; or a usual solenoid-actuated valve may be used, as shown.

An air line 128 extends to the retainer 126 and communicates with a passageway 130 in the retainer. The passageway 130 extends through the retainer 126 to the face of the retainer. This face is contiguous with the leading card in the stack 100. The line 128 has its opposite end coupled to a solenoid valve 131. This valve is connected to a suitable vacuum pump (not shown) through an air line 132. The solenoid valve has a winding 133 associated with it, and the valve is opened whenever this winding is energized by the flow of electric current through it. The winding 133 is controllably and selectively energized by any suitable control system as indicated by the block 135. Although the solenoid valve 131 and its associated control system are shown somewhat schematically in Figure 1, suitable apparatus is shown and described in detail in co-pending application Serial No. 552,506, filed December 12, 1955, by Hans M. Stern.

The vacuum pump referred to in the preceding paragraph applies a constant vacuum pressure through the line 132 to the valve 131. So long as the valve is open, the vacuum pressure is transmitted through the line 128 to the passageway 130 in the retainer 126. This creates a vacuum pressure at the face of the retainer. This vacuum pressure holds the leading card in the stack 100 against the vacuum pressure exerted on that card by the peripheral surface of the rotatable drum 20. The cards are, therefore, retained in the stack 100 by the retainer 126 so long as the vacuum pressure is maintained at the face of the retainer.

When the flow of electrical current through the winding 133 from the control system 135 is terminated, the valve 131 closes. This removes the vacuum pressure from the line 128, from the passageway 130 in the retainer 126 and from the face of the retainer. Therefore, the leading card in the stack 100 is withdrawn by the vacuum pressure at the periphery of the drum 20 and is circulated around that drum. So long as the vacuum pressure at the retainer 126 is interrupted, cards are continuously withdrawn from the exit end of the stack 100 by the vacuum pressure at the peripheral surface of the drum 20. In this way, an intermittent or continuous transfer of cards can be obtained from the intermediate stack 100 to the drum 20 in accordance with the operation of the retainer 126.

Whenever a card is removed from the exit end of the stack 100, the vacuum pressure from the periphery of the drum 20 and from the retainer 126 (if the retainer is re-activated) draws the next card in the stack 100 up to the exit end of the stack. In this manner, cards may be fed through the entrance end into the stack 100 in the manner described for storage in the stack with the leading card being drawn to the exit end of the stack. Whenever the vacuum pressure is removed from the retainer 126, the leading card is released to the drum 20. The next card is then drawn to the exit end of the stack 100. By this means, cards may be controllably transferred from the drum 16 to the drum 20, and any desired number of cards may be stored for any desired length of time during such transfer. Since different numbers of cards can be stored in the stack 100 at different instants of time, the stack can be considered as a variable delay line. The delay is dependent in part upon the number of cards in the stack 100 and in part upon the rate at which cards are released from the input stack 12 by the retainer 90.

A second lifter 140 is disposed in essentially tangential relation with the periphery of the drum 20. The lifter 140 is displaced angularly from the stack 100 in the direction of rotation of the drum 20. The constructional details of the lifter 140 may be similar to those of the lifter 104. The lifter 140 is controlled by a solenoid valve 142, this valve being positioned in an air line 143 connecting the lifter 140 to a suitable source of air pressure (not shown).

A pair of spaced parallel guide rails 144 and 145 are mounted on the table top 14 between the drums 16 and 20 and in the vicinity of the lifter 140. These guide rails may be similar to the guide rails disclosed in co-pending application Serial No. 614,686 mentioned above. These guide rails are generally arcuate in form and are in essentially tangential relationship with the drums. The inner guide rail 144 is somewhat longer than the outer guide rail 145 (as shown) and both guide rails are shorter in length than the length of each card. Also, the ends of the guide rails are displaced a sufficient distance from the drums to permit the free passage of cards carried by either drum past the rails. For example, cards positioned on the drum 20 may be carried by the drum past the guide rails 144 and 145 when the lifter 140 is not activated.

The arrangement is such that when the valve 142 is energized, it opens and closes streams of air to be emitted by the lifter 140 against the peripheral surface of the drum 20. These air streams effectively shear the cards from the periphery of the drum 20. The leading edge of a card so sheared then enters the passageway between the rails 144 and 145. Continued rotation of the drum 20 pushes the card further and further into this passageway. Since the guide rails are shorter than the length of the cards, the leading edge of the card comes under the influence of the vacuum pressure at the periphery of the drum 16 before the trailing edge becomes released from the vacuum force exerted on the card by the drum 20. The card is, therefore, drawn against the periphery of the drum 16 for fixed positioning on the drum periphery. Because of this, continued rotation of the drums 16 and 20 causes the card to be transferred to the periphery of the drum 16 without any slippage or lost motion of the card and without any possibility of losing the card.

An output stack 150 and associated stop member 152 and pawls 154 are mounted adjacent the drum 20. This latter output stack is displaced around the drum 20 from the stack 100 in the direction of rotation of this drum. The constructional details of the output stack 150 and its associated components may be similar to those of the output stack 101 and the components associated with the stack 101.

Therefore, cards may be fed in the described manner from the input stack 12 onto the peripheral surface of the drum 16. These cards are circulated by the drum 16 and may be deposited in the output stack 101 or transferred by suitable gates (not shown) to other drums (also not shown) to undergo various processing operations such as those of merging, sorting and collating. The cards may also be transferred from the drum 16 to the stack 100. Such a transfer may be desired at particular times such as when the order of the cards is to be rearranged since it is desirable to selectively delay for a particular time interval one or more of the cards with respect to the other cards. Whenever such a delay is required, a suitable control system responding to a particular one or more of the cards may cause the solenoid valve 114 to be energized. This causes the selected cards to enter the stack 100 in the manner described.

Control of the retainer 126 can cause the cards to be held in the stack for any variable interval to provide a corresponding delay. The interval can also be made variable by controlling the number of cards held in the stack 100 at any instant. The delay can also be made variable by controlling the time at which the cards become released by the retainer 90 from the input stack 12 to the drum 16. After a selectively controlled interval dependent upon the operations of the retainers 90 and 126 and upon the number of cards in the stack 100, cards in the stack may become transferred from the stack to the drum 20 by interrupting the vacuum force produced by the retainer 126.

The cards transferred to the drum 20 may move with the drum to the output stack 150 for depositing in the stack. As an alternative, the solenoid valve 142 may be energized so that the streams of air from the lifter 140 will return the cards (via the guide rails 144 and 145) to the periphery of the drum 16. The returned cards now reach the drum 16 at a time which is delayed with respect to the time at which the cards would have originally travelled along the drum. The delay is dependent in part upon the number of cards in the stack 100 and the times at which the various cards in the stack were transferred from the input stack 12 to the drum 16.

By using the stack 100 to provide a variable delay, the cards collected in the stack 101 may be rearranged with respect to their disposition in the input stack 12. Certain cards originally in the stack 12 can also be removed by the intermediate stack 100 and the drum 20 so as to become deposited in the output stack 150. In this way, a plurality of different controls can be exerted by the apparatus constituting this invention on the cards transferred from the input stack 12. These controls operate to rearrange the cards on a flexible basis with respect to the original order of the cards. The invention provides, therefore, relatively simple apparatus for controlling the position and eventual disposition of a plurality of cards.

Although this application has been disclosed and illustrated with reference to particular applications, the principles involved are susceptible of numerous other applications which will be apparent to persons skilled in the art. The invention is, therefore, to be limited only as indicated by the scope of the appended claims.

What is claimed is:

1. In combination for processing a plurality of information cards each having a plurality of bits of signal information, a rotatable drum for transporting the cards on its periphery, housing means disposed adjacent the transporting drum for housing a number of such information cards and having an entrance and a separate exit, first transfer means for transferring cards from the peripheral surface of the drum through said entrance into said housing means, and second transfer means for transferring cards from the exit of said housing means back to the peripheral surface of said drum.

2. In combination for processing a plurality of information cards each having a plurality of bits of signal information, a rotatable drum for transporting the cards on its periphery, card stacking means disposed adjacent the transporting drum for housing a selected number of such information cards in stacked condition, first controllable transfer means for selectively transferring cards from the peripheral surface of the drum to said stacking means, an auxiliary transporting means, second controllable transfer means for selectively transferring cards from said stacking means to said auxiliary transporting means, and third transfer means for transferring back to the peripheral surface of the drum the cards introduced to said auxiliary transporting means by said second controllable transfer means.

3. In combination for processing a plurality of information cards each having a plurality of bits of signal information, a rotatable drum for transporting the cards on its periphery, card stacking means disposed adjacent the transporting drum for housing a selected number of such information cards in stacked condition, first controllable transfer means for selectively transferring cards from the peripheral surface of the drum to the stacking means, an auxiliary vacuum pressure rotatable transporting drum, second controllable transfer means for selectively transferring cards from said stacking means to said auxiliary transporting drum, and third transfer means for transferring back to the peripheral surface of the first-mentioned transporting drum the cards introduced to said auxiliary transporting drum by said second controllable transfer means.

4. In combination for processing a plurality of information cards each having a plurality of bits of signal information, a rotatable transporting drum constructed to receive a vacuum force at its periphery to retain the cards in fixed position on its periphery during the drum rotation, card stacking means disposed adjacent the transporting drum for housing a selected number of such information cards in stacked condition, said stacking means having an entrance at one end and an exit at the other end, means for selectively subjecting cards on the peripheral surface of the drum to a controllable stream of a fluid under pressure to transfer selected ones of the cards through said entrance into said stacking means, an auxiliary rotatable transporting drum disposed adjacent said exit end of said stacking means and constructed to receive a vacuum force at its periphery, means for exerting a controllable vacuum pressure on the leading face of the card in said stacking means adjacent said exit selectively to control the transfer of cards from said stacking means to the peripheral surface of said auxiliary transporting drum, and means for selectively subjecting cards on the peripheral surface of said auxiliary drum to a stream of a fluid under pressure to transfer cards on the peripheral surface of said auxiliary drum back to the peripheral surface of the first mentioned transporting drum.

5. In combination for processing a plurality of information cards each having a plurality of bits of signal information, a rotatable drum for transporting the cards on its peripheral surface, means coupled to the drum to receive cards from the drum and to retain variable number of cards, means for controlling the number of cards transferred from the drum to the retaining means at any instant, and means for providing for a transfer of the cards in the retaining means back to the drum at particular instants to co-operate with the retaining means in providing a delay line variable in accordance with the number of cards in the retaining means.

6. In combination for processing a plurality of cards each having a plurality of bits of signal information, a rotatable drum for transporting the cards on its peripheral surface, static means coupled at a first end to the drum to receive cards from the drum and to retain a variable number of cards, means disposed in co-operative relationship with the retaining means at a second end of the retaining means for normally preventing the transfer of cards out of the retaining means and for obtaining a transfer of cards out of the retaining means at particular times to provide in the retaining means a time delay variable in accordance with the number of cards in the retaining means, and means for returning to the drum particular cards moving out of the retaining means.

7. In combination for processing a plurality of information cards each having a plurality of bits of signal information, a first rotatable drum for holding cards in fixed position on its periphery during the drum rotation, a second rotatable drum for holding cards in fixed positioning on its periphery during the drum rotation, a stack disposed between the drums for receiving a plurality of cards from the first drum and for applying the cards to the second drum in the same order as their movement into the first drum, means for transferring to the stack particular cards moving with the first drum, means associated with the stack and the second drum for normally restraining the transfer of cards from the stack to the second drum and for providing for a transfer of cards at particular times, and means coupling the second said first drums for providing for a transfer of particular cards on the second drum back to the first drum.

8. In combination for processing a plurality of information cards each having a plurality of bits of signal information, a rotatable drum for holding the cards in fixed position on the periphery of the drum during the drum rotation, a stack disposed in contiguous relationship to the drum to hold cards transferred from the drum, means including a first coupling mechanism for obtaining a transfer of selected cards from the drum into the stack and for obtaining the movement of the other cards with the drum past the stack, and means including a second coupling mechanism for obtaining a transfer of selected cards in the stack back to the drum for movement with the drum.

9. In combination for processing a plurality of information cards each having a plurality of bits of signal information, a first rotatable drum for holding cards in fixed position on the periphery of the drum during the drum rotation, a stack disposed at a first end in contiguous relationship to the first drum to receive cards from the drum, means including a first coupling mechanism associated with the stack and the first drum for providing for a movement of particular cards with the drum past the stack and for providing for a transfer of other cards to the stack, a second rotatable drum disposed in contiguous relationship to the stack at the second end of the stack to obtain the transfer of cards in the stack to the second drum and to hold the cards in fixed position on the periphery of the drum during the drum rotation, means associated with the stack and the second drum for providing a controlled transfer of cards from the stack to the second drum only at particular times, and means including a second coupling mechanism associated with the stack and the second drum and operative upon the cards transferred from the stack to the second drum to provide for a movement of particular cards with the second drum and for providing for a transfer of other cards from the second drum to the first drum.

10. In combination for processing a plurality of information cards each having a plurality of bits of signal information, a first rotatable drum for carrying the cards on its periphery, a second rotatable drum for carrying the cards on its periphery, means including an input stack disposed in contiguous relationship to the first drum to hold a plurality of cards and to transfer the cards sequentially to the drum, means including a coupling stack disposed between the first and second drums for receiving different numbers of cards from the first stack and for transferring the cards to the second drum after a time delay dependent upon the number of cards in the coupling stack, means including coupling apparatus associated with the first drum and the coupling stack for controlling the transfer of the cards from the drum to the stack, means including restraining apparatus associated with the second drum and the coupling stack for controlling the transfer of the cards from the stack to the drum, means including a first output stack for receiving the cards travelling on the first drum past the coupling stack, and means including a second output stack for receiving the cards transferred to the second drum from the coupling stack.

11. In combination for processing a plurality of information cards each having a plurality of bits of signal information, a first rotatable drum for carrying the cards on its periphery, a second rotatable drum for carrying the cards on its periphery, means including an input stack disposed in contiguous relationship to the first drum to hold a plurality of cards and to transfer the cards sequentially to the drum, means including a coupling stack disposed between the first and second drums for receiving different numbers of cards from the first stack and for transferring the cards to the second drum after a time delay dependent upon the number of cards in the coupling stack and in the same order as their reception in the coupling stack, means including first coupling apparatus associated with the first drum and the coupling stack for providing for a movement of particular cards with the first drum past the coupling stack and for providing for a transfer of other cards from the drum to the stack, means including restraining apparatus associated with the second drum and the coupling stack for providing for a retention of the cards in the stack at particular times and for providing for a transfer of the cards from the stack to the drum at other times, means including second coupling apparatus associated with the first and second drums for providing for a movement of particular cards with the second drum past the coupling apparatus and for providing for a transfer of other cards on the second drum to the first drum, means including a first output stack for receiving the cards travelling on the first drum past the first coupling apparatus and the cards transferred from the second drum to the first drum, and means including a second output stack for receiving the cards travelling on the second drum past the second coupling apparatus.

12. In combination for processing a plurality of information cards each having a plurality of bits of signal information, a first rotatable drum constructed to receive a vacuum force on its periphery to hold the cards in fixed position on the periphery as the drum rotates, a second rotatable drum constructed to receive a vacuum force on its periphery to hold the cards in fixed position on the periphery as the drum rotates, means for applying a vacuum force to the peripheries of the first and second drums, static retaining means disposed between the first and second drums for receiving different numbers of cards from the first drum and for retaining the cards with the first card in the retaining means disposed against the second drum for removal of the card from the stack by the second drum, means including coupling means associated with the first drum and the retaining means for normally providing for the movement of the cards with the first drum past the retaining means and for applying fluid against the cards at particular times to produce a force for transferring the cards from the first drum to the retaining means, and means including restraining means associated with the second drum and the retaining means for normally providing a vacuum pressure against the first card in the retaining means to prevent the cards from being transferred to the second drum and for interrupting the vacuum force at particular times to obtain a transfer of cards in the retaining means to the second drum.

13. The combination set forth in claim 12 in which second coupling means are associated with the first and second drums for normally providing for the movement of the cards with the second drum past the coupling means and for applying fluid against the cards on the second drum at particular times to produce a force for transferring the cards from the second drum to the first drum, in which first output means are associated with the first drum for receiving the cards moving with the first drum past the first coupling means and the cards transferred from the second drum to the first drum, and in which second output means are associated with the second drum for receiving the cards moving with the second drum past the second coupling means.

14. The combination set forth in claim 10 in which means including restraining apparatus is disposed in contiguous relationship to the input stack to control the rate at which the cards in the stack are transferred to the drum for a control over the time at which the cards are transferred from the first drum to the second drum through the coupling stack.

15. In combination for processing a plurality of information cards each having a plurality of bits of signal information, transport means for the cards, static means positioned at a first end for coupling to the transport means to obtain a transfer of a variable number of cards from the transport means and to retain these cards and positioned to provide for a movement of other cards by the transport means past the position of transfer to the retaining means, means disposed in co-operative relationship with the retaining means at the first end of the retaining means for providing a controlled transfer of cards from the transport means to the retaining means, means disposed in co-operative relationship to the retaining means at a second end of the retaining means for normally preventing the transfer of cards out of the retaining means and for obtaining a transfer of cards out of the retaining means at particular times to provide in the retaining means a time delay variable in accordance with the number of cards in the retaining means, and means for returning to the transport means particular cards moving out of the retaining means.

16. In combination for processing a plurality of information cards each having a plurality of bits of signal information, means for providing a movement of the cards, means disposed at one end in coupled relationship to the card-moving means for receiving cards from the card-moving means and for retaining a variable number of cards, means disposed at a second end of the retaining means for controlling the number of cards transferred from the card-moving means to the retaining means at any instant, and means including a guide member for providing for a transfer of cards in the retaining means back to the transport means at particular instants to cooperate with the retaining means and the control means in providing a delay line variable in accordance with the number of cards in the retaining means.

17. In combination for processing a plurality of information cards each having a plurality of bits of signal information, first means for providing a transport of cards, card stacking means disposed adjacent the transport means for housing a selected number of such information cards in stacked condition, first controllable transfer means for selectively transferring first cards from the transport means to the stacking means and for providing for a movement of second cards by the transport means past the position of transfer to the stacking means, auxiliary means for providing a transport of cards, second controllable transfer means for selectively obtaining a transfer of cards from said stacking means to said auxiliary transport means, and third transfer means for obtaining a transfer back to the first transport means of the cards introduced to the auxiliary transport means by said second controllable transport means.

18. In combination for processing a plurality of information cards each having a plurality of bits of signal information, means for providing a movement of the cards, means for holding a plurality of such information cards and having an entrance disposed adjacent the card-moving means and having a separate exit displaced from the card-moving means, first transfer means disposed in coupled relationship to the card moving means near the entrance to the holding means for obtaining a transfer of cards from the card-moving means to the holding means through the entrance in the holding means, and means including second transfer means disposed in coupled relationship to the cards in the holding means at the exit to the holding means for obtaining a transfer of cards through the exit in the holding means back to the card-moving means.

19. In combination for processing a plurality of information cards each having a plurality of bits of signal information, first transport means for providing a movement of the cards, second transport means for providing a movement of the cards, a stack disposed between the transport means for receiving a plurality of cards from the first transport means and for applying the cards to the second transport means in the same order as their movement into the stack, means for coupling the stack and the first transport means for obtaining a transfer to the stack of first cards moved by the transport means and for providing a movement of second cards by the transport means past the position of transfer to the stack, restraining means associated with the stack and the second transport means for normally preventing the transfer of cards from the stack to the second transport means and for providing for such a transfer of cards at particular times, and means coupling the first and second transport means for providing for a transfer of first particular cards from the second transport means to the first transport means and for providing for a movement of second particular cards by the second transport means past the position of transfer to the first transport means.

20. In combination for processing a plurality of information cards each having a plurality of bits of signal information, transport means for the cards, a stack disposed in contiguous relationship to the transport means to hold cards transferred from the transport means, means including a first coupling mechanism for obtaining a transfer of first selected cards from the transport means into the stack and for obtaining a movement of the other cards by the transport means past the stack, and means including a second coupling mechanism for obtaining a transfer of the cards from the stack and for obtaining a transfer of selected ones of the cards back to the transport means for movement by the transport means and including means coupled to the stack for receiving the other cards transferred from the stack.

21. In the combination for processing a plurality of information cards each having a plurality of bits of signal information, first transport means for the cards, second transport means for the cards and disposed in spaced relationship to the first transport means, static retaining means disposed between the first and second transport means and having a first opening constituting an entrance for receiving cards from the first transport means and having a second opening displaced from the first opening and constituting an exit for passing the cards to the second transport means after a variable time delay dependent upon the number of cards in the retaining means, means coupled to the first transport means near the first opening in the static retaining means for obtaining a controlled transfer of cards from the first transport means to the static retaining means, and means operative upon the cards in the card holding means at the second opening in the card holding means for obtaining a controlled transfer of cards from the static retaining means to the second transport means.

22. The combination set forth in claim 21 in which the transport means are movable and in which the static retaining means constitutes a stack constructed to hold the cards in stacked relationship and to receive the cards from the first transport means through the first opening and to pass the cards to the second transport means through the second opening.

23. In combination for processing a plurality of information cards each having a plurality of bits of signal information, first means for obtaining a movement of the cards, second means for obtaining a movement of the cards and disposed in spaced relationship to the first card-moving means, a static delay line disposed between the first and second card-moving means and constructed to hold cards in stacked relationship and provided with a first opening near the first card-moving means to receive the cards from the first card-moving means and provided with a second opening near the second card-moving means to pass cards through the opening to the second card-moving means, transfer means disposed in coupled relationship to the first card-moving means at a position near the first opening in the static delay line to obtain a transfer to the static delay line of the cards moved by the first card-moving means, means operative upon the cards in the static delay line at the second opening in the delay line for obtaining a controlled transfer of cards to the second card-moving means, receiving means disposed in coupled relationship to the second card-moving means for receiving cards transferred to the second card-moving means, and second transfer means disposed at one end in coupled relationship to the second card-moving means at a position before the receiving means in the direction of movement of the cards and disposed at the other end in coupled relationship to the first card-moving means for obtaining a transfer to the first card-moving means of particular ones of the cards transferred to the second card moving means.

References Cited in the file of this patent

UNITED STATES PATENTS

| | | |
|---|---|---|
| 1,040,025 | Schlesinger | Oct. 1, 1912 |
| 2,693,957 | Welsh | Nov. 9, 1954 |
| 2,752,154 | Nelson | June 26, 1956 |

UNITED STATES PATENT OFFICE
CERTIFICATE OF CORRECTION

Patent No. 2,905,465

September 22, 1959

Philip N. Armstrong et al.

It is hereby certified that error appears in the printed specification of the above numbered patent requiring correction and that the said Letters Patent should read as corrected below.

Column 10, line 21, before "variable" insert -- a --; line 59, for "said first drums" read -- and first drums --.

Signed and sealed this 3rd day of May 1960.

(SEAL)
Attest:

KARL H. AXLINE
Attesting Officer

ROBERT C. WATSON
Commissioner of Patents